United States Patent
Dai et al.

(10) Patent No.: US 11,822,797 B1
(45) Date of Patent: Nov. 21, 2023

(54) OBJECT COMPUTATIONAL STORAGE SYSTEM, DATA PROCESSING METHOD, CLIENT AND STORAGE MEDIUM

(71) Applicant: BEIJING SUPERSTRING ACADEMY OF MEMORY TECHNOLOGY, Beijing (CN)

(72) Inventors: Jin Dai, Beijing (CN); Yunsen Zhang, Beijing (CN)

(73) Assignee: BEIJING SUPERSTRING ACADEMY OF MEMORY TECHNOLOGY, Beijing (CN)

( * ) Notice: Subject to any disclaimer, the term of this patent is extended or adjusted under 35 U.S.C. 154(b) by 0 days.

(21) Appl. No.: 18/304,247

(22) Filed: Apr. 20, 2023

Related U.S. Application Data (63) Continuation of application No. PCT/CN2022/140177, filed on Dec. 19, 2022.

(30) Foreign Application Priority Data

Jul. 27, 2022 (CN) .......................... 202210888039.6

(51) Int. Cl.
  *G06F 12/00* (2006.01)
  *G06F 3/06* (2006.01)
(52) U.S. Cl.
  CPC .......... *G06F 3/0629* (2013.01); *G06F 3/0607* (2013.01); *G06F 3/0685* (2013.01)
(58) Field of Classification Search
  CPC ......... G06F 12/0246; G06F 2212/7203; G06F 2212/7207
  See application file for complete search history.

(56) References Cited

U.S. PATENT DOCUMENTS

2015/0347058 A1   12/2015   Lam
2021/0081128 A1   3/2021    Kurichiyath et al.
(Continued)

FOREIGN PATENT DOCUMENTS

CN   106662980 A   5/2017
CN   109885577 A   6/2019
(Continued)

OTHER PUBLICATIONS

First Office Action for Chinese Application No. 202210888039.6, dated Sep. 6, 2022, 19 Pages (including English Translation).
(Continued)

*Primary Examiner* — Yong J Choe
(74) *Attorney, Agent, or Firm* — BROOKS KUSHMAN P.C.

(57) ABSTRACT

An object computational storage system, a data processing method, a client end and a storage medium are disclosed, belonging to the field of electrical digital data processing, including a storage control device and a storage chip or a storage disk connected thereto. The storage control device is a computational storage management system, and performs the following processing: receiving an external data processing request, parsing information of a specified storage object, information of a specified function, and information of input data carried by the data processing request; when it is determined that calling the specified function for the specified storage object is supported, calling the specified function to perform computation on data of the specified storage object according to the input data; and returning a computation result to a sender of the data processing request.

22 Claims, 6 Drawing Sheets

(56) References Cited

U.S. PATENT DOCUMENTS

| | | |
|---|---|---|
| 2021/0124516 A1 | 4/2021 | Love et al. |
| 2021/0133208 A1 | 5/2021 | Tomlinson |
| 2021/0365208 A1 | 11/2021 | Li |
| 2022/0188028 A1 | 6/2022 | Mesnier et al. |

FOREIGN PATENT DOCUMENTS

| | | |
|---|---|---|
| CN | 113177045 A | 7/2021 |
| CN | 113424144 A | 9/2021 |
| CN | 113568908 A | 10/2021 |
| CN | 114490023 A | 5/2022 |
| CN | 114968127 A | 8/2022 |

OTHER PUBLICATIONS

Notification to Grant an Invention Patent for Chinese Application No. 202210888039.6, dated Sep. 7, 2022, 8 Pages (including English Translation).

Chen et al., "Review on HDD-SD Hybrid Storage," Journal of Computer Applications, May 10, 2017, pp. 1217-1222, 37 (5), China Academic Journal Electronic Publishing House, 16 Pages (including English Translation).

Li et al., "Review on HDD-based, SSD-based and Hybrid Key-value Stores," 2017 IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress, 2017, pp. 1236-1241.

OBJECT COMPUTATIONAL STORAGE SYSTEM, DATA PROCESSING METHOD, CLIENT AND STORAGE MEDIUM

CROSS-REFERENCE TO RELATED APPLICATIONS

This application is a continuation of International PCT Application No. PCT/CN2022/140177 filed on Dec. 19, 2022, which claims priority to Chinese Patent Application No. 202210888039.6 filed on Jul. 27, 2022, which are incorporated herein by reference in their entireties.

TECHNICAL FIELD

The present disclosure relates to, but is not limited to, storage technology, in particular to an object computational storage system, a data processing method, a client, and a storage medium.

BACKGROUND

Cloud computing has adopted an architecture where computation and storage are separated and data storage servers and compute servers (e.g., hosts) are connected through a network. In the era of big data, a lot of computing energy consumption is used in data transportation, and the architecture of separation of computation and storage brings the problems of high energy consumption and computing power not increasing with the amount of data.

SUMMARY

The following is a summary of subject matters described herein in detail. This summary is not intended to limit the protection scope of the claims.

In a first aspect, an embodiment of the present disclosure provides an object computational storage system including a storage control device, and a storage chip or a storage disk connected to the storage control device, the storage control device is a computational storage management system and is configured to perform at least the following processing:
  receiving an external data processing request, parsing information of a specified storage object, information of a specified function, and information of input data carried by the data processing request;
  in a case that it is determined that calling the specified function for the specified storage object is supported, calling the specified function to perform computation on data of the specified storage object according to the input data; and
  returning a computation result to a sender of the data processing request.

In a second aspect, an embodiment of the present disclosure provides a data processing method for an object computational storage system with computing capability, the method includes:
  receiving a data processing request, parsing information of a specified storage object, information of a specified function, and information of input data carried by the data processing request;
  in a case that it is determined that calling the specified function for the specified storage object is supported, calling the specified function to perform computation on data of the specified storage object according to the input data; and
  returning a computation result to a sender of the data processing request.

In a third aspect, an embodiment of the present disclosure provides a data processing method applied to a client, the method includes:
  sending a data processing request to an object computational storage system with computing capability, carrying information of a specified storage object of which data needs to be computed, information of a specified function, and information of input data;
  receiving a computation result returned by the object computational storage system, wherein the computation result is obtained by calling the specified function to perform computation on data of the specified storage object according to the input data.

In a fourth aspect, an embodiment of the present disclosure provides a CSP in an object computational storage system, including: a bus interface, and a logic circuit component coupled to the bus interface; the logic circuit component is configured as a computational storage management system to perform the data processing method of any embodiment of the second aspect.

In a fifth aspect, an embodiment of the present disclosure provides a main control chip of an SSD, including: a bus interface, and a logic circuit component coupled to the bus interface; the logic circuit components is configured as a computational storage management system to perform the data processing method of any embodiment of the second aspect.

In a sixth aspect, an embodiment of the present disclosure provides a client, including: a communication interface, and a logic circuit component coupled to the communication interface; the logic circuit component is configured as a computational storage management system to perform the data processing method of any embodiment of the third aspect.

In a seventh aspect, an embodiment of the present disclosure provides a non-volatile storage medium having stored thereon computer instructions that, when executed by a processor, implement the acts of the method of any of the embodiments.

Compared with the prior art, the object computational storage system, the data processing method, the client end and the storage medium provided according to at least one embodiment of the present application have the following beneficial effects.

The object computational storage system is expanded to a computational storage management system, so that more big data processing can be carried out on the storage side, an integrated architecture of computation and storage is realized, and more computing energy consumption caused by data transportation is effectively reduced.

Other aspects will become apparent after reading and understanding the drawings and detailed description.

BRIEF DESCRIPTION OF THE DRAWINGS

The accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Embodiments of the present disclosure will be described in detail with reference to the accompanying drawings. The embodiments in the present disclosure and the features in the embodiments may be combined with each other arbitrarily if there is no conflict.

Many embodiments are described herein, but the description is exemplary rather than restrictive, and to those of ordinary skills in the art, there may be more embodiments and implementation solutions within the scope contained in the embodiments described herein. Although many possible feature combinations are shown in the drawings and discussed in specific implementation modes, many other combinations of the disclosed features are possible. Unless expressly limited, any feature or element of any embodiment may be used in combination with, or may replace, any other feature or element in any other embodiment.

The present disclosure includes and contemplates combinations with features and elements known to those of ordinary skill in the art. The disclosed embodiments, features and elements of the present disclosure may also be combined with any conventional features or elements to form the solutions defined by the claims. Any feature or element of any embodiment may also be combined with features or elements from other solutions to form another solution defined by the claims. Accordingly, it should be understood that any of the features shown and discussed in the present disclosure may be implemented alone or in any suitable combination. Thus the embodiments are not subject to limitations other than those made in accordance with the appended claims and their equivalent substitutions. In addition, various modifications and changes can be made within the protection scope of the appended claims.

In addition, when a representative embodiment is described, a method or process may have already been presented in a specific sequence of acts in the specification. However, to an extent that the method or process does not depend on a specific sequence of the acts in present disclosure, the method or process should not be limited to the acts in the specific sequence. As will be understood by those of ordinary skill in the art, other act orders are possible. Therefore, the specific order of the acts illustrated in the specification should not be interpreted as a limitation on claims. In addition, the claims with respect to the method or process should not be limited to executing their acts according to the written order. Those skilled in the art may easily understand that these orders may change, and are still maintained in the spirit and scope of the embodiments of the disclosure.

The present disclosure is directed to computing scenarios close to data, in particular to a scenario of placing a storage management system, such as a key value storage system or an object storage system, on the data server side. The object storage system is a storage management system widely used in data centers and cloud computing systems at present. Get (fetch), Put (save) and Delete (delete) operations on data are supported. However, as a storage management system, it does not support or effectively support data processing functions.

Figure 1A:
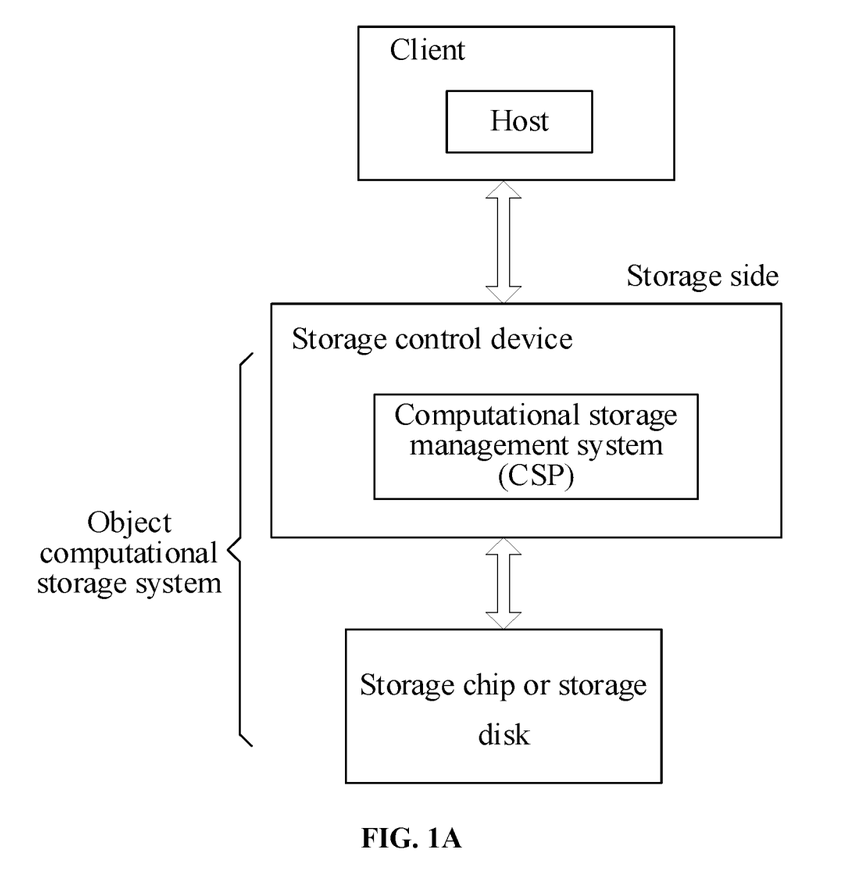
FIG. 1A is a block diagram of a structure of an object computational storage system provided according to an exemplary embodiment of the present disclosure.
Figure 1B:
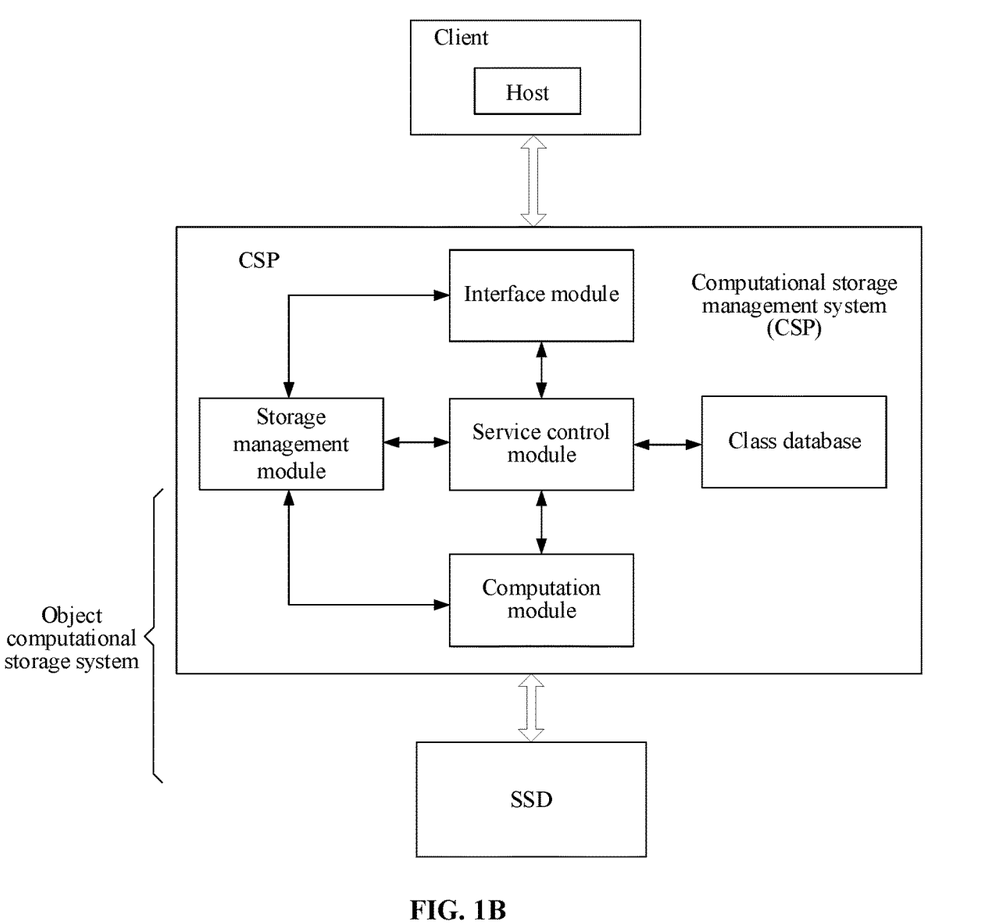
FIG. 1B is a block diagram of a structure of an object computational storage system provided according to another exemplary embodiment of the present disclosure.
Figure 1C:
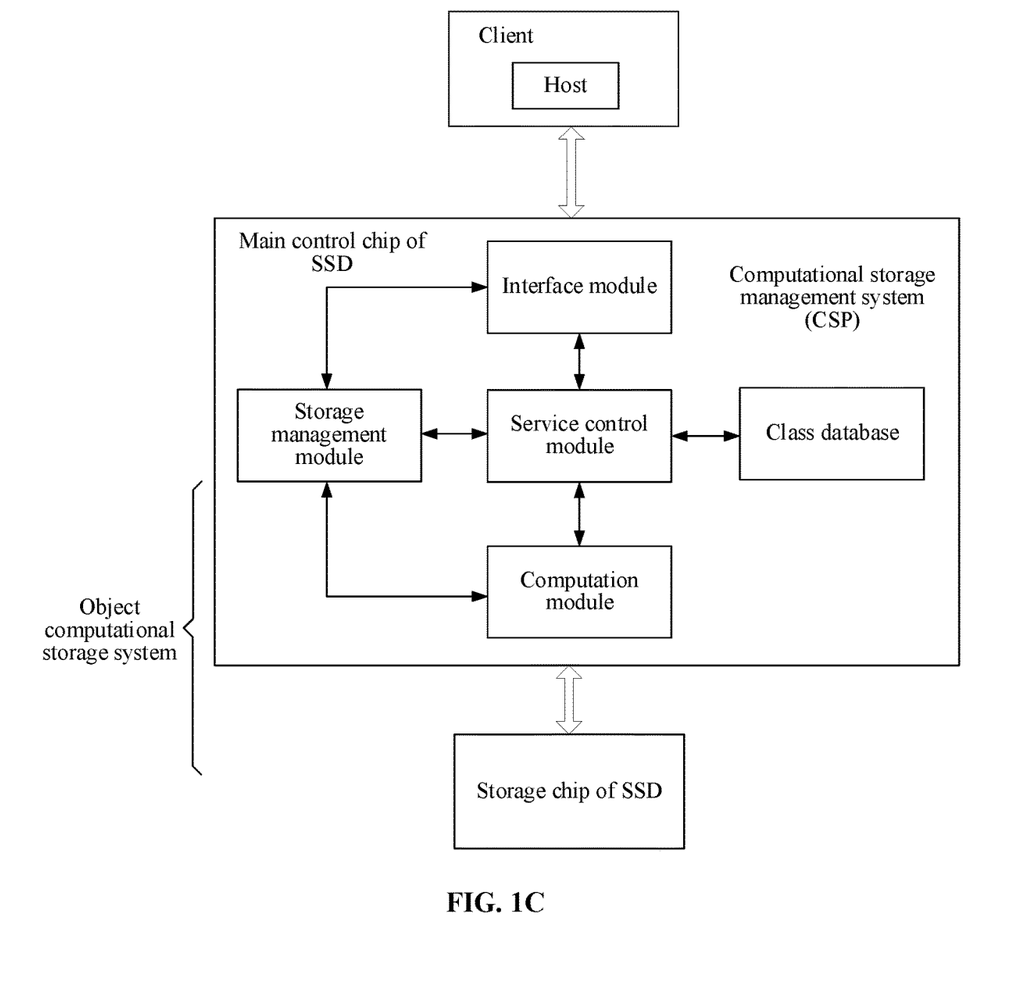
FIG. 1C is a block diagram of a structure of an object computational storage system provided according to yet another exemplary embodiment of the present disclosure.

FIG. 1A is a block diagram of a structure of an object computational storage system provided according to an exemplary embodiment of the present disclosure, FIG. 1B is a block diagram of a structure of an object computational storage system provided according to another exemplary embodiment of the present disclosure, and FIG. 1C is a block diagram of a structure of an object computational storage system provided according to yet another exemplary embodiment of the present disclosure. The object computational storage system is an object storage system with computing capability, as shown in FIGS. 1A to 1C. The object computational storage system may include a storage control device, and a storage chip or a storage disk connected to the storage control device. The storage control device may be a computational storage management system configured to perform at least the following processing: receiving an external data processing request, parsing information of a specified storage object, information of a specified function, and information of input data carried by the data processing request; when it is determined that calling the specified function for the specified storage object is supported, calling the specified function to perform computation on data of the specified storage object according to the input data; and returning a computation result to a sender of the data processing request.

With the architecture, interface and integrated architecture of computation and storage provided according to an embodiment of the present disclosure, the object computational storage system is expanded to a computational storage management system, so that more big data processing can be carried out at the storage side. As shown in FIGS. 1A to 1C, the object computational storage system can be connected with an external system (which can be referred to as an external requester), and the external system may be used as a side requesting computation to send a data processing request to the object computational storage system at the storage side.

The external system may include a client, the client may include a host or a mobile terminal, and the host may be a host of a personal computer or a host in the cloud.

The external requester can call a corresponding specified function through the information of the specified storage object (such as the identification of the specified storage object) and the information of the specified function (such as the name or number of the specified function). The object computational storage system finds the specified function in the request in the object computational storage system itself, determines that calling the specified function for the specified storage object is supported, runs the specified function inside the storage device, and returns the result of data computation and processing obtained by calling the specified function to the external requester.

The object computational storage system is located on the storage side, and can interact with the client. The storage control device included in the object computational storage system can be configured as a computational storage management system. The computational storage management system receives the data processing request sent by the client to the object computational storage system, gets the data of the specified storage object according to the information of the specified storage object carried by the data processing request, and when it is determined that calling the specified function for the specified storage object is supported, calls the specified function to perform computation on the data of the specified storage object according to the input data, and returns the computation result to the client.

The storage management system of an embodiment of the present disclosure is integrated into the storage side (such as the storage device), and can independently receive and process the data processing request sent by the client to the object computational storage system without the computation migration instructions between the host and the storage side (such as the storage device).

In the storage management system of traditional computing architecture, a software system that manages the storage address of a storage object in a block storage device runs in a host computer. However, the block storage device itself is not intelligent and does not hold the information related to the storage address of the storage object. It may be very difficult to perform computation close to the storage for power saving purposes.

Compared with the storage management system of the traditional computing architecture, an embodiment of the present disclosure can integrate the computational storage management system into the storage side (such as the storage device), can receive the data processing request of the client, independently get the data of the specified storage object according to the information of the specified storage object, and perform computation on the data.

The computational storage management system of an embodiment of the present disclosure does not include a host, and the host does not need to process the client request and then send computational migration instructions to the storage device, but the computational storage management system can directly interact with the client, receive data processing requests from the client, independently complete data extraction, determine whether the computation is supported, and, if so, complete the computation, and return the result to the client. If the request passes through the host on the request route, the host only needs to forward the request without parsing and processing. The interface for computational storage is simpler and more efficient, which is beneficial to industrial division of labor.

In an example, the computational storage management system can perform computation on the data of the specified storage object by the following way: for example, loading the specified function and getting the data of the specified storage object according to the information of the specified storage object; running the specified function to obtain computation result data by using the data of the specified storage object and the input data as inputs to the specified function.

When the specified function in the request is found, the computational storage management system loads the specified function, inputs the data of the specified storage object and the information of the input data in the request (the input data itself or the storage address of the input data), performs the computation to obtain computation result data, and returns the computation result data (the computation result data itself or the storage address of the computation result data) to the external requester.

As for the object computational storage system provided according to an embodiment of the disclosure, the object computational storage system is expanded into a computational storage management system, so that more big data processing can be carried out at the storage side, and an integrated architecture of computation and storage is realized, which can at least effectively reduce the large computing energy consumption caused by data transportation.

In an exemplary embodiment of the present disclosure, the computational storage management system may include a class library that stores all supported functions and is provided with a function that can be called by a storage object according to the class of the storage object.

The computational storage management system may include a class library, which stores one or more functions for each object class, and the stored one or more functions are used for processing and computing the same class of data. The functions specified for an object is not limited to one. When there are multiple functions specified for an object, each function can have its own input data.

Embodiments of the present disclosure introduce the concept of data class to facilitate code reuse in computational storage applications, and data of the same class can be processed by a set of functions.

The computational storage management system determines whether calling the specified function for the specified storage object is supported by the following way: searching the class library according to the class information of the specified storage object; and when it is determined that the object computational storage system can call the specified function according to the search result, determining that calling the specified function for the specified storage object is supported.

After receiving the data processing request sent by the external requester, the computational storage management system searches for the specified storage object in the storage according to the information of the object in the request, finds the data of the object and determines the class of the object. The computational storage management system searches the class library according to the class of the object, and if the serial number or name of the specified function in the request is found, loads the specified function, inputs the data of the object and the input data in the request, and carries out computation. If the serial number or name of the specified function in the request cannot be found, an error message is returned.

In an exemplary embodiment of the present disclosure, the information of the specified storage object may include an identification of the specified storage object, and the computational storage management system may search the metadata of the specified storage object according to the identification of the specified storage object to determine the class of the specified storage object.

Each storage object can include metadata, which contains Class information. The computational storage management system can search for the specified storage object in the storage according to the identification of the object, find the metadata and data of the object, and the computational storage management system checks the metadata to determine the class of the object.

In an alternative embodiment, the information of the specified storage object may include the class of the specified storage object and a filter condition for filtering the specified storage object from objects of that class.

In this embodiment, the data processing request sent by the external requester can carry the class of the specified storage object, and the computational storage management system can directly search the class library according to the class of the object. If the serial number or name of the specified function in the request is found, the specified function is loaded, and the data of the object and the input data in the request are input for computation. If the serial number or name of the specified function in the request cannot be found, an error message is returned.

In an exemplary embodiment of the present disclosure, the information of the input data may include the input data itself.

In this embodiment, the data processing request sent by the external requester can carry the input data itself, and the computational storage management system can directly use the input data as an input of the specified function, and run the specified function to obtain the computation result data.

In an alternative embodiment, the information of the input data may include a storage address of the input data; the processing performed by the computational storage management system may further include getting the input data from the storage address of the input data according to the storage address by using the communication protocol of direct memory access.

In an exemplary embodiment of the present disclosure, the data processing request sent by the external requester does not include the input data, but carries the address where the input data is stored. The computational storage management system can read the input data by using the communication protocol of direct memory access (such as PCIe or RDMA) and perform computation. RDMA stands for Remote Direct Memory Access.

In an exemplary embodiment of the present disclosure, the computation result returned by the computational storage management system to the sender of the data processing request may be the computation result data. In an exemplary embodiment of the present disclosure, the computational storage management system may directly return the computation result data to the external requester.

In an alternative embodiment, the computation result returned by the computational storage management system to the sender of the data processing request may be a storage address of the computation result data, and the computational storage management system puts the computation result data into the storage address by using the communication protocol of direct memory access.

In an exemplary embodiment of the present disclosure, the computational storage management system returns the storage address of the computation result data to the external requester, and the computational storage management system can write the computation result data into the storage address by using the communication protocol of direct memory access (such as PCIe or RDMA).

In an exemplary embodiment of the present disclosure, the specified storage object may include a specified database, the specified function may include a query, and the input data may include a query instruction.

The class of the object can be a relational database, the requested function can be a SQL query, and the input data can be a SQL query instruction. The computational storage management system finds a corresponding database according to the identification (ID) of the specified database, inputs SQL instructions to perform a data query, and returns the query result directly, which can avoid a large amount of data being sent to compute servers (such as hosts) for simple comparison.

In an exemplary embodiment of the present disclosure, the specified storage object may include a specified picture or video, the specified function may include processing of the picture or video, and the input data may include processing instructions of the picture or video.

The class of the object may be a picture or video, the requested function may be processing of the picture or video (e.g. face recognition of the picture), and the input data may be processing instructions of the picture or video (e.g. face recognition instructions). The computational storage management system finds a corresponding picture according to the identification (ID) of the specified picture, inputs the face recognition instructions to carry out face recognition, and directly returns the face recognition result.

In an exemplary embodiment of the present disclosure, as shown in FIG. 1B, the storage control device may include a Computational storage Processor (CSP for short) board connected to Peripheral Component Interconnect Express (PCIe for short) bus, and the computational storage management system may be a CSP board that cooperates with an SSD including a flash memory chip or a mechanical hard disk (HDD) including a storage disk within the object computational storage system.

The computational storage management system and related supporting hardware can be made into a CSP board plugged into the PCIe bus of the system (for example, plugged into the host), the instructions of the storage computation management system can be received and processed through the CSP board to control one or more SSD or HDD to perform storage and computation. Both CSP and SSD are plugged into the PCIe bus of the system, and the CSP and SSD communicate with each other using the PCIe point-to-point protocol.

In an embodiment of the present disclosure, a CSP board defined by the International Standards Organization SNIA and a set of storage disks can be loaded into a storage server for use in a data center. The compute server may include a host, and the host may be remotely connected with the CSP and SSD over a network, and send computational storage instructions to the CSP and SSD. The client is defined as a service requester, and the compute server is defined as a service provider, which can provide service to the client. The host can act as a client or a compute server.

In an alternative embodiment, as shown in FIG. 1C, the storage chip may be a flash memory chip of the SSD, and the storage control device may be a main control chip of the SSD.

Traditional storage devices only support reading and writing by block addresses and do not have an intelligent computing processing function. An embodiment of the present disclosure can add a computational storage management system and related hardware to an SSD control chip, and the SSD control chip and a set of flash memory chips form an SSD capable of performing computational tasks. SSD can be directly plugged into a compute server (such as a host), and the host can send computational storage instructions to SSD.

The storage management system of an embodiment of the present disclosure is integrated into the storage side (such as the storage device), and can independently receive and process the data processing request sent by the client to the object computational storage system without the computation migration instructions between the host and the storage side (such as the storage device).

In an exemplary embodiment of the present disclosure as shown in FIG. 1A, the computational storage management module may include an interface module, a service control module, a storage management module and a computation module.

The interface module is configured to communicate with an external system.

The service control module is configured to receive an external data processing request through the interface module, parse information of a specified storage object, information of a specified function and information of input data carried by the data processing request, and return a computation result computed by the computation module to the external system through the interface module.

The computation module is configured to call the specified function to perform computation on data of the specified storage object based on the input data if it is determined that the calling of the specified function for the specified storage object is supported.

The storage management module is configured to read and store related data, for example, to store the information of the input data carried by the data processing request.

Figure 2:
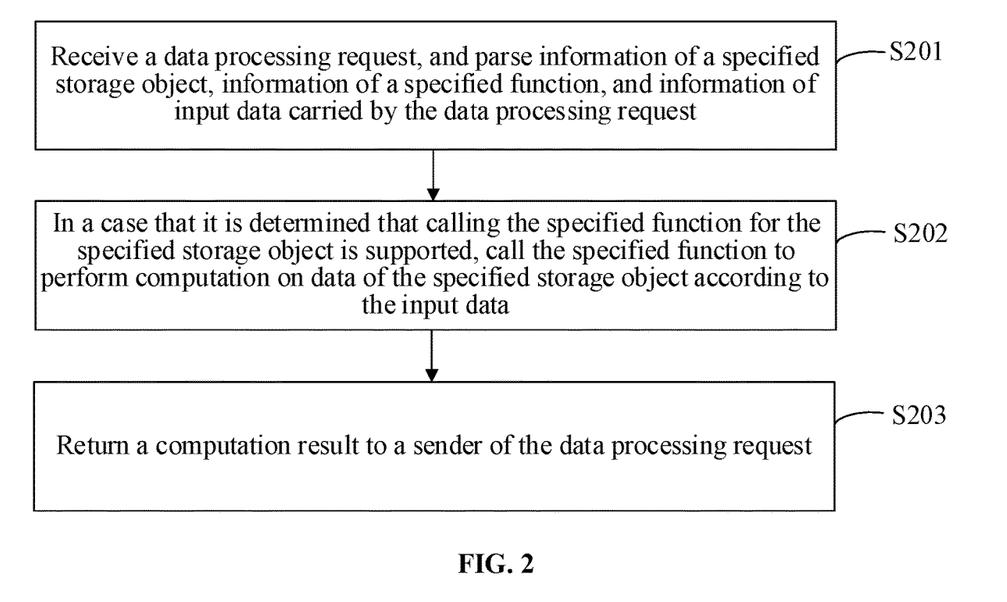
FIG. 2 is a flowchart of a data processing method provided according to an exemplary embodiment of the present disclosure.

FIG. 2 is a flowchart of a data processing method provided according to an exemplary embodiment of the present disclosure, which may be applied to an object computational storage system with computing capability shown in any embodiment. As shown in FIG. 2, the data processing method may include following acts S201, S202, and S203.

In S201, a data processing request is received, and information of a specified storage object, information of a specified function, and information of input data carried by the data processing request are parsed.

In S202, in a case that it is determined that calling the specified function for the specified storage object is supported, calling the specified function to perform computation on data of the specified storage object according to the input data.

In S203, a computation result is returned to a sender of the data processing request.

In this embodiment, the object computational storage system can be expanded into a computational storage management system, so that more big data processing can be carried out at the storage side.

The external requester can call the corresponding specified function through the information of the specified storage object (such as the identification of the specified storage object) and the information of the specified function (such as the name or number of the specified function). The object computational storage system finds the specified function in the request in the object computational storage system itself, determines that calling the specified function for the specified storage object is supported, runs the specified function inside the storage device, and returns the result of data computation and processing obtained by calling the specified function to the external requester.

The execution body of the data processing method provided according to an embodiment of the present disclosure is the object computational storage system shown in any embodiment, and the implementation principle and implementation effect are similar, which will not be repeated here.

In an exemplary embodiment of the present disclosure, the computational storage management system may include a class library, the class library stores all supported functions and is provided with functions that can be called by a storage object according to the class of the storage object. The computational storage management system determines whether calling the specified function for the specified storage object is supported, which can include following operations: searching the class library according to the class information of the specified storage object; and when it is determined that the object computational storage system can call the specified function according to the search result, determining that calling the specified function for the specified storage object is supported.

In an exemplary embodiment of the present disclosure, the information of the specified storage object may include an identification of the specified storage object, and before searching the class library according to the class information of the specified storage object, the following operation can also be included: searching metadata of the specified storage object based on the identification of the specified storage object to determine the class of the specified storage object.

In an exemplary embodiment of the present disclosure, the information of the input data may include the input data itself.

In an exemplary embodiment of the present disclosure, the information of the input data may include the storage address of the input data. Before calling the specified function according to the input data, the following operation can also be included: getting the input data from the storage address of the input data according to the storage address by using the communication protocol of direct memory access.

In an exemplary embodiment of the present disclosure, calling the specified function to perform computation on the data of the specified storage object according to the input data may following operations: loading the specified function and getting the data of the specified storage object according to the information of the specified storage object; running the specified function to obtain computation result data by using the data of the specified storage object and the input data as inputs to the specified function.

In an exemplary embodiment of the present disclosure, the computation result may include computation result data.

In an exemplary embodiment of the present disclosure, after the computation result data is obtained by the specified function, the following operation can also be included: putting the computation result data in a specified storage location; the computation result includes the storage address of the computation result data.

In an exemplary embodiment of the present disclosure, the specified storage object may include a specified database, the specified function may include a query, and the input data may include a query instruction.

In an exemplary embodiment of the present disclosure, the specified storage object may include a specified picture or video, the specified function may include processing of the picture or video, and the input data may include processing instructions of the picture or video.

Figure 3:
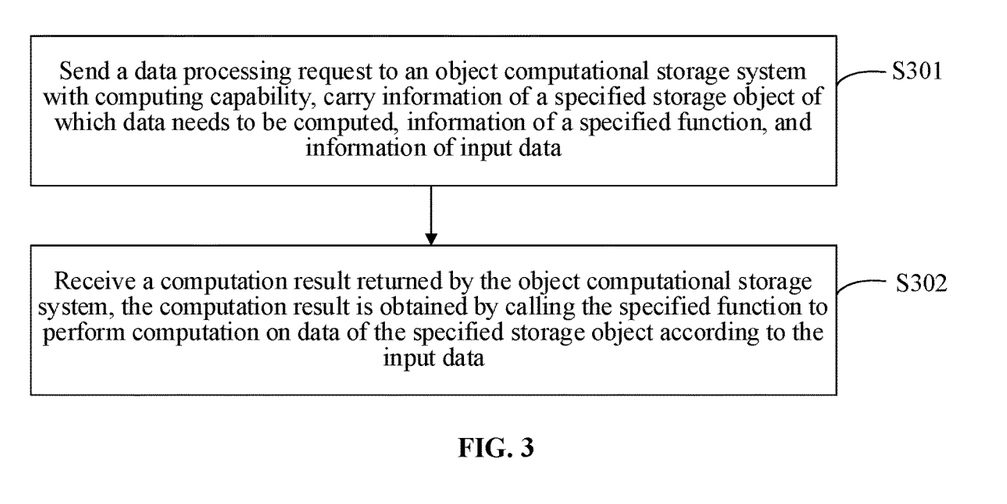
FIG. 3 is a flowchart of a data processing method provided according to another exemplary embodiment of the present disclosure.

FIG. 3 is a flowchart of a data processing method provided according to another exemplary embodiment of the present disclosure, which may be applied to a client, and the client is the side requesting computation. As shown in FIG. 3, the data processing method may include following acts S301 and S302.

In S301, a data processing request is sent to an object computational storage system with computing capability, information of a specified storage object of which data needs to be computed, information of a specified function, and information of input data are carried.

In S302, a computation result returned by the object computational storage system is received, and the computation result is obtained by calling the specified function to perform computation on data of the specified storage object according to the input data.

The data processing requester can be the client requesting the computation (which can be called the external requester)

and call the corresponding specified function through the information of the specified storage object (such as the identification of the specified storage object) and the information of the specified function (such as the name or number of the specified function). The object computational storage system finds the specified function in the request in the object computational storage system itself, determines that calling the specified function for the specified storage object is supported, runs the specified function inside the storage device, and returns the result of data computation and processing obtained by calling the specified function to the external requester.

In this embodiment, the side requesting computation sends a data processing request to an object computational storage system at the storage side, and can receive the computation result computed by the object computational storage system at the storage side, and the side requesting computation does not need to move data from the storage side for computation processing. Accordingly, an integrated architecture of computation and storage is realized, and more computing energy consumption caused by data transportation is effectively reduced.

The data processing method provided according to an embodiment of the present disclosure corresponds to the data processing method of the object computational storage system at the storage side, and has the same implementation principle and implementation effect, which will not be repeated here.

In an exemplary embodiment of the present disclosure, the information of the input data may include the input data itself; or, the information of the input data may include the storage address of the input data.

In an exemplary embodiment of the present disclosure, the computation result may include computation result data.

In an example, the computation result may include the storage address of the computation result data; the data processing method may further include: getting the computation result data according to the storage address information of the computation result data.

In an exemplary embodiment of the present disclosure, the information of the specified storage object may include an identification of the specified storage object.

In an exemplary embodiment of the present disclosure, the data processing method may further include querying the object computational storage system or a management center of the object computational storage system for at least one of the following information: whether the object computational storage system supports computation; a class of an object on which the object computational storage system supports performing computation; a function provided by the object computational storage system for one or more classes of objects on which the object computational storage system supports performing computation.

Figure 4:
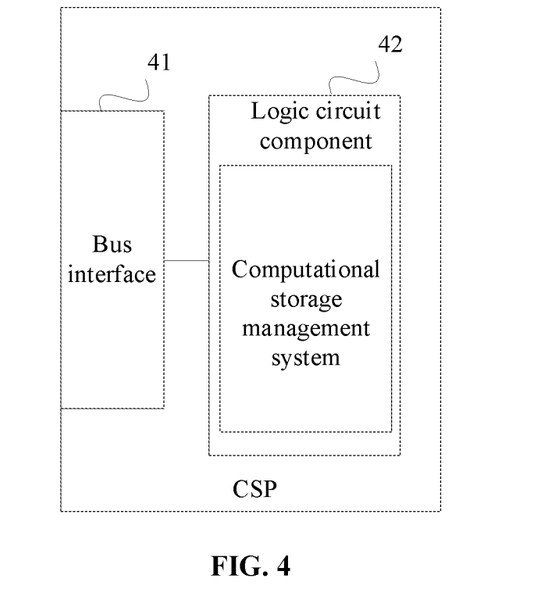
FIG. 4 is a block diagram of a structure of a CSP in an object computational storage system provided according to an exemplary embodiment of the present disclosure.

FIG. 4 is a block diagram of a structure of a CSP in an object computational storage system provided according to an exemplary embodiment of the present disclosure. As shown in FIG. 4, the CSP in the object computational storage system may include: a bus interface 41, and a logic circuit component 42 coupled to the bus interface. The logic circuit component is configured as a computational storage management system to perform the data processing method as shown in any embodiment at the side of the object computational storage system.

In an example, the bus interface of the CSP may include a PCIe interface.

Figure 5:
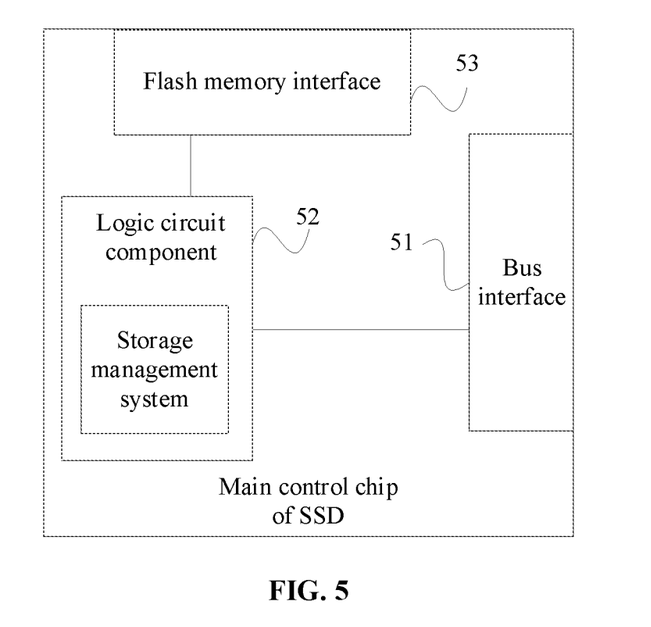
FIG. 5 is a block diagram of a structure of a main control chip of an SSD provided according to an exemplary embodiment of the present disclosure.

FIG. 5 is a block diagram of a structure of a main control chip of an SSD provided according to an exemplary embodiment of the present disclosure. As shown in FIG. 5, the main control chip of a Solid State Drive (SSD for short) may include: a bus interface 51, and a logic circuit component 52 coupled to the bus interface. The logic circuit component is configured as a computational storage management system to perform the data processing method as shown in any embodiment at the side of the object computational storage system.

In an example, a bus interface of a main control chip of an SSD may include a PCIe interface.

In an example, as shown in FIG. 5, a main control chip of an SSD may also include a flash memory interface 53 configured to be connected to a flash memory chip.

Figure 6:
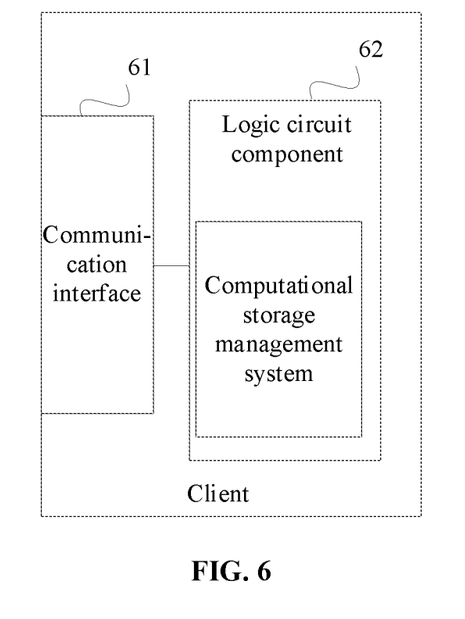
FIG. 6 is a block diagram of a structure of a client provided according to an exemplary embodiment of the present disclosure.

FIG. 6 is a block diagram of a structure of a client provided according to an exemplary embodiment of the present disclosure. As shown in FIG. 6, the client may include: a communication interface 61, and a logic circuit component 62 coupled with the communication interface. The logic circuit component is configured as a computational storage management system to perform the data processing method as shown in any embodiment of the client.

An embodiment of the present disclosure also provides a non-volatile storage medium having stored thereon computer instructions that, when executed by a processor, implement the acts of the data processing method shown in any of the embodiments.

It may be understood by those of ordinary skill in the art that all or some acts in a method and function modules/units in a system and an apparatus disclosed above may be implemented as software, firmware, hardware, and appropriate combinations thereof. In a hardware implementation mode, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, a term computer storage medium includes volatile and nonvolatile, and removable and irremovable media implemented in any method or technology for storing information (for example, computer-readable instructions, a data structure, a program module, or other data). The computer storage medium includes, but is not limited to, RAM, ROM, EEPROM, a Flash RAM, or another memory technology, CD-ROM, a Digital Versatile Disk (DVD) or another optical disk storage, a magnetic box, a magnetic tape, magnetic disk storage or another magnetic storage apparatus, or any other media that may be used for storing desired information and may be accessed by a computer. In addition, it is known to those of ordinary skill in the art that the communication medium usually includes computer-readable instructions, a data structure, a program module, or other data in a modulated data signal of, such as, a carrier or another transmission mechanism, and may include any information delivery medium.

The invention claimed is:

1. An object computational storage system, located at a storage side, capable of interacting with a client, comprising a storage control device and a storage chip or a storage disk connected to the storage control device, wherein the storage control device is a computational storage management system and is configured to perform at least following processing:
  receiving a data processing request sent by the client to the object computational storage system, parsing information of a specified storage object, information of a specified function, and information of input data carried by the data processing request;
  in a case that it is determined that calling the specified function for the specified storage object is supported, getting data of the specified storage object according to the information of the specified storage object, and calling the specified function to perform computation on data of the specified storage object according to the input data; and
  returning a computation result to the client;
  wherein the computational storage management system comprises a class library, the class library stores all of supported functions, and is provided with a function that is capable of being called by a storage object according to a class of the storage object;
  the computational storage management system determines whether calling the specified function for the specified storage object is supported by a following way: searching the class library according to class information of the specified storage object; and in a case that it is determined that the object computational storage system is capable of calling the specified function according to a search result, determining that calling the specified function for the specified storage object is supported.

2. The object computational storage system of claim 1, wherein the storage chip is a flash memory chip of a Solid State Drive (SSD), and the storage control device is a main control chip of the SSD.

3. The object computational storage system of claim 1, wherein
  the storage control device comprises a Computational storage Processor (CSP) board connected to a system Peripheral Component Interconnect Express (PCIe) bus, the computational storage management system is the CSP board, and the CSP board cooperates with an SSD comprising a flash memory chip or a Hard Disk Drive (HDD) comprising a storage disk in the object computational storage system.

4. The object computational storage system of claim 1, wherein
  the computational storage management system performs computation on the data of the specified storage object by a following way: loading the specified function; and running the specified function to obtain computation result data by using the data of the specified storage object and the input data as inputs to the specified function.

5. The object computational storage system of claim 1, wherein
  the specified storage object comprises a specified database, the specified function comprises a query, and the input data comprises a query instruction; or
  the specified storage object comprises a specified picture or video, the specified function comprises processing of a picture or video, and the input data comprises a processing instruction of a picture or video.

6. The object computational storage system of claim 5, wherein
  the information of the specified storage object comprises an identification of the specified storage object, and the computational storage management system searches metadata of the specified storage object according to the identification of the specified storage object to determine a class of the specified storage object.

7. The object computational storage system of claim 1, wherein
  the information of the input data comprises the input data itself; or
  the information of the input data comprises a storage address of the input data; the processing executed by the computational storage management system further comprises: getting the input data itself from the storage address by using a communication protocol of direct memory access based on the storage address of the input data.

8. The object computational storage system of claim 1, wherein
  the computation result returned by the computational storage management system to the sender of the data processing request is computation result data or a storage address of the computation result data, and the computational storage management system stores the computation result data into the storage address by using a communication protocol of direct memory access.

9. A data processing method, applied to the client in the object computational storage system of claim 1, comprising:
  sending a data processing request to an object computational storage system with computing capability, carrying information of a specified storage object of which data needs to be computed, information of a specified function, and information of input data;
  receiving a computation result returned by the object computational storage system, wherein the computation result is obtained by calling the specified function to perform computation on data of the specified storage object according to the input data.

10. The method of claim 9, wherein
the information of the input data comprises the input data itself; or, the information of the input data comprises a storage address of the input data.

11. The method of claim 9, wherein
the computation result comprises computation result data; or
the computation result comprises a storage address of the computation result data; the method further comprises: getting the computation result data according to the storage address information of the computation result data.

12. The method of claim 9, wherein
the information of the specified storage object comprises an identification of the specified storage object.

13. The method of claim 9, wherein
the method further comprises querying the object computational storage system or a management center of the object computational storage system for at least one of the following information:
  whether the object computational storage system supports computation;
  a class of an object on which the object computational storage system supports performing computation; and
  a function provided by the object computational storage system for one or more classes of objects on which the object computational storage system supports performing computation.

14. A client, comprising: a communication interface, and a logic circuit component coupled to the communication interface; wherein the logic circuit component is configured as a computational storage management system to perform the data processing method of claim 9.

15. A data processing method, applied to an object computational storage system with computing capability, comprising:
receiving a data processing request sent by a client to the object computational storage system, parsing information of a specified storage object, information of a specified function, and information of input data carried by the data processing request;
in a case that it is determined that calling the specified function for the specified storage object is supported, getting data of the specified storage object according to the information of the specified storage object, and calling the specified function to perform computation on data of the specified storage object according to the input data; and
returning a computation result to the client,
wherein a computational storage management system comprises a class library, the class library stores all of supported functions, and is provided with a function that is capable of being called by a storage object according to a class of the storage object;
the computational storage management system determines whether that calling the specified function for the specified storage object is supported by a following way:
searching the class library according to class information of the specified storage object; and in a case that it is determined that the object computational storage system is capable of calling the specified function according to a search result, determining that calling the specified function for the specified storage object is supported.

16. The method of claim 15, wherein
the information of the specified storage object comprises an identification of the specified storage object, and before searching the class library according to the class information of the specified storage object, the method further comprises searching metadata of the specified storage object according to the identification of the specified storage object to determine a class of the specified storage object.

17. The method of claim 15, wherein
the information of the input data comprises the input data itself; or
the information of the input data comprises a storage address of the input data, and before calling the specified function according to the input data, the method further comprises: getting the input data itself from the storage address by using a communication protocol of direct memory access based on the storage address of the input data.

18. The method of claim 15, wherein
calling the specified function to perform computation on the data of the specified storage object according to the input data comprises:
loading the specified function; and
running the specified function to obtain computation result data by using the data of the specified storage object and the input data as inputs to the specified function.

19. The method of claim 18, wherein
the computation result comprises computation result data; or
after running the specified function to obtain the computation result data, the method further comprises: putting the computation result data in a specified storage location; the computation result comprises a storage address of the computation result data.

20. The method of claim 15, wherein
the specified storage object comprises a specified database, the specified function comprises a query, and the input data comprises a query instruction; or
the specified storage object comprises a specified picture or video, the specified function comprises processing of a picture or video, and the input data comprises a processing instruction of a picture or video.

21. A storage control device, comprising: a bus interface, and a logic circuit component coupled to the bus interface; wherein the logic circuit component is configured as a computational storage management system to perform the data processing method of claim 15;
wherein the storage control device is a computational storage processor (CSP) in an object computational storage system, or, the storage control device is a main control chip of a solid state disk (SSD).

22. A non-volatile storage medium having stored thereon computer instructions that, when executed by a processor, implement acts of the method of claim 15.

* * * * *